United States Patent [19]

Goldstein

[11] 4,216,073
[45] Aug. 5, 1980

[54] ION EXCHANGE RESIN CONTAINING ACTIVATED CARBON

[75] Inventor: Arthur L. Goldstein, Weston, Mass.

[73] Assignee: Ionics Inc., Watertown, Mass.

[21] Appl. No.: 42,753

[22] Filed: May 29, 1979

[51] Int. Cl.² ............................................. C25B 13/08
[52] U.S. Cl. .................................. 204/296; 204/301; 204/180 P; 429/192; 429/251; 571/27
[58] Field of Search .................. 204/296, 195 M, 301; 521/27; 429/192, 251

[56] References Cited

U.S. PATENT DOCUMENTS

| | | | |
|---|---|---|---|
| 2,514,415 | 7/1950 | Rasch | 521/27 X |
| 3,375,208 | 3/1968 | Duddy | 521/27 X |
| 3,989,615 | 11/1976 | Kiga et al. | 204/252 |
| 4,089,758 | 5/1975 | McAloon | 204/98 |
| 4,130,473 | 12/1978 | Eddleman | 204/252 |

FOREIGN PATENT DOCUMENTS 7249424 12/1972 Japan ........................................ 204/296

Primary Examiner—F. Edmundson
Attorney, Agent, or Firm—Norman E. Saliba

[57] ABSTRACT

This invention is directed to electrodialysis, electrochemical cell and membrane cell equipment particularly to components comprising the ion exchange membranes. These membranes are fabricated with the polymer containing occluded particles of activated carbon. The activated carbon lessens the tendency for membranes, especially the anion selective type, to foul when employed in the electrodialysis of solutions containing fouling constituents. The membranes are obtained by polymerizing a mixture of a liquid monomer and activated carbon particles.

12 Claims, No Drawings

ION EXCHANGE RESIN CONTAINING ACTIVATED CARBON

The present invention relates to cross-linked, electrically conductive ion-exchange polymers, especially ion-selective homogeneous membranes, containing activated carbon, to the method of preparing the membranes and to the electrochemical cell for employing the same. More particularly the invention is directed to anion selective membranes having a dispersion of activated granular, or powdered carbon therein and specifically to the strongly basic anion types containing exchange groups of quaternary ammonium.

Many uses have been found for permselective membranes. One use, in particular, is the demineralization of water by removing the salts therefrom by a membrane process known as electrodialysis. During the electrodialysis of aqueous solutions (especially those containing organic vegetable matter such as surface waters) the membranes both cationic and/or anionic types frequently suffer fouling. This fouling is especially noticeable with the strongly basic types of anion selective membranes such as those containing quaternary ammonium ion exchange groups. These fouling substances which are present in the solution being electrodialyzed are evidenced during operation by a considerable increase in the resistance (voltage) of the membrane demineralizer over a period of time. Another cause of increased resistance may be due to the destruction of the ion-exchange functional groups such as the quaternary ammonium groups which are appended to the membrane polymer structure. It is especially noticed that strong oxidants such as chlorine ($Cl_2$) or its dissociable products in aqueous solutions (hypochlorites) will often result in irreversible oxidative damage to the ion exchange groups and sometimes appreciable damage to the polymer structure itself. An ionically dissociated group such as the quaternary ammonium group will by such oxidation be rendered non-ionic and again this will be noted as a rise in the electrical resistance of the membrane electrodialysis cell.

Prior attempts to eliminate or reduce the destructive effects of foulant or oxidative materials on ion-exchange membranes included the use of activated carbon in a pretreatment step for removing the offending material from the water prior to its being desalted. This involved the placing of an activated charcoal filter bed or cartridge upstream of the electrodialysis stack so as to absorb the foulants or dissolved chlorine prior to the water entering the stack. Apparatus employing ion-exchange membranes and their method of operation to effect the above mentioned uses are more fully described in U.S. Pats. Nos. Re. 24,865, 2,694,680, 2,708,658, 2,848,403, 2,826,544, 2,863,813, 3,003,940, 3,239,442, 3,341,441, 4,115,225 and many others.

It has been found that the fouling of membranes under the circumstances described hereinabove may be partially overcome and alleviated by the use of ion-exchange membranes containing occluded activated charcoal. The inclusion of the activated carbon into the body of the polymeric material during the membrane manufacturing stage will delay the aforementioned degradation by absorbing and traping foulants and dissolved chlorine in "situ", thus the membranes would give additional portection for longer membrane life should the pretreatment with the charcoal bed or cartridge fail for any reason. It was quite unexpectedly found that activated carbon could be added to the liquid organic monomeric mixture prior to the heat polymerization step without substantially affecting or poisoning the polymerization catalyst. It was further determined that the carbon retained much of its activity and did not become exhausted from absorbtion of the organics of the liquid mixture as would have been expected. Membranes prepared in such manner, especially the anion membranes were found to be more resistant to hypochlorite degradation than similary prepared membranes not containing the activated carbon particles.

It is therefore, the primary object of this invention to manufacture cross-linked polymeric "board" structures measuring at least one centimeter in two dimensions for use as intermediate structures in the production of ion-permselective membranes of both the cation and anion type.

A futher object is to utilize activated carbon containing polymeric ion-selective membranes as hydraulic separators in electrolytic, electrodialysis and other membrane cell equipment in the treatment of solutions containing membrane fouling or oxidizing constituents.

Other objects and advantages of the present invention will become apparent to one skilled in the art from the following description and appended claims.

The solid polymeric matrix or skeleton suitable for use as the intermediate structure in the manufacture of novel, ion-selective membranes containing activated carbon can be prepared by copolymerizing a variety of monomers (which are well known in the art) under conditions that will yield a polymeric "board" structure containing occluded activated carbon within the resin. For the purposes of this disclosure a "board" is the sheet or film of a highly cross-linked polymeric resin structure prior to the introduction of ion-exchange groups therein, which groups give the polymeric resin the ability to act as an ion-permselective membrane. It will be apparent that the boards are not normally endowed with ion-exchange characteristics of either anion or cation charge until such ion-exchange active groups have been attached thereto. The boards, however, are the base or intermediate material from which either cation or anion-exchange membranes may be obtained by known chemical treatment of the same to introduce known positive or negative ion-exchange groups. Reinforcement of the board may be provided by one or more layers of a support material which is not generally subject to chemical attack such as woven glass (Fiberglas ®), polytetrafluoroethylene (Teflon ®), polypropylene. polyethylene, and the like, on which the polymer is cast. The board itself is prepared for example by copolymerizing a monomeric compound having one polymerizable double bond such as a monovinyl compound of styrene with a cross-linking monomeric compound having at least two polymerizable double bonds such as for example, divinylbenzene. An important factor in the fabrication of the membranes is the use of an inert non-polymerizable (NP) organic solvent into which the double bond monomeric compounds are first diluted prior to the polymerization. This inert solvent should be present during polymerization to the extent or at least 10% by volume based on the total volume of the monomeric mixture including the solvents. Although a minimum total solvent content of about 10% has been found effective for purposes of this invention, preferred embodiments include much larger amounts between 20–50%. Structures including as much as a total of 75% solvent have been found to be quite satisfactory. The monomeric mixture containing the finely divided activated carbon is seeded with a small quantity of polymerization catalyst such as Azo-Bis-Isobutylronitrile. The total board thickness should be from 1 to 100 mils (preferably 10 to 25 mils).

For purposes of this disclosure the term "activated cabon" is defined herein as a fine granular or powdered carbon which is activated to impart high absorbent qualities to the carbon. The carbon which is preferably of animal origin such as bone charcoal is normally produced by distillation of carbonacious material and thereafter subjected to an appropriate activation process. Activation is customarily carried out by heating at high temperatures (800°–900° C.) which produces in the carbon a particulated structure. The carbon is generally present in the copolymer up to 40 parts by weight per hundred parts by weight of the polymer/carbon mixture and preferable from 2 to 25 parts. Usually the finely divided carbon has an active surface area of 300 to 2000 square meters per gram ($M^2$/gm). Suitable activated carbon such as bone charcoal are readily available under the Trade Name of NUCHAR.

For purposes of this disclosure solvents are those having boiling points which are higher (preferable at least 10° C. higher) than the polymerization temperature employed, should be inert to the polymerization reaction (in that they do not react chemically or polymerize with the monomers) should preferably be totally miscible with the starting liquid monomers and should act as a swelling agent for the resulting solid copolymer by being absorbed or imbibed therein. The use of various solvents for membrane fabrication is fully disclosed in U.S. Pat. Nos. 2,730,768, 2,731,441, 2,780,604 etc. and include for example liquid aromatic hydrocarbons such as diethylbenzene; ketones such as methyl ethyl ketone; ethers such as diethylene glycol dimethyl ether (diglyme) etc. The volume of solvent present during polymerization determines the percent porosity and substantially fixes the solvent or water holding capacity or content of the resulting polymeric structure. The solvent contained in the polymeric structure can be replaced by another solvent, and the structure will imbibe about the same volume of water or other liquid as was present as original solvent during the polymerization reaction.

As was previously stated a preferred type of homogeneous membrane may be produced from a polymeric matrix structure resulting from combining a polyvinyl aromatic compound such as divinyl benzene with a monovinyl aromatic compound such as styrene or ethyl styrene diluted in a solvent and polymerized in the presence of a catalyst.

These resulting polymers are converted into ion-permselective membranes by well known techniques as by the introduction of cation groups such as sulfonic acid, carboxylic acid etc. or by the introduction of anion groups such as amines etc. Anion groups can be introduced for example by chloromethylating the polymeric board structure and then aminating to introdce the quaternary ammonium groups. Cation groups can be introduced for example by sulfonating the board structure by reacting with a sulfonation agent such as concentrated sulfuric acid, oleum, chlorosulfonic acid etc. Other suitable ionic acidic ion exchange reactive groups (catonic) are those generally used in ion exchange reactions, e.g. phosphonic, phosphinic, thiophosphinic, arsonic and carboxy. Other suitable ionic basic ion exchange groups (anionic) are also known from the art include primary, secondary or tertiary amino groups, phosphonium, tertiary sulphonium groups and the like.

Other type monomers useful in the present invention are for example acrylic acid or acrylic esters for preparing weak acid carboxylic resins, vinyl pyridine and substituted vinyl pyridine for preparing weak base anion exchange resins which can be methylated to produce quaternary ammonium strong base resins. Other nitrogen-containing vinyl monomers such as acrylamide and vinyl amines can be used to prepare anion exchange material.

A totally aliphatic type polymer which is suitable in the present invention is prepared by the copolymerization of methacrylate ester monomers, that is, reacting a polyunsaturated crosslinking methacrylate ester monomer containing at least two vinyl groups with an ionogenic methacrylate ester monomer. Suitable polyunsaturated crosslinking methacrylate esters are the polyol methacrylate ester monomers. These include the glycol dimethacrylates such as ethylene glycol dimethacrylate (EGDM), neopentyl glycol dimethacrylate, polyethylene glycol dimethacrylate, trimethylol propane trimethacrylate, bis-phenol A dimethacrylate, and pentaerythritol tri and tetramethacrylate.

In the synthesis of anion selective membranes, methacrylate esters containing amine groups of the tertiary type are copolymerized with crosslinking methacrylate esters. The presence of the pendant amine groups provides sites for quaternization of the polymer. Suitable esters include especially dimethylamino ethyl methacrlate (DMAEM), diethylamino ethyl methacrylate, t-butylaminoethyl methacrylate and the like.

In the synthesis of cation selective polymers the functional monomer employed includes for example 2 sulfoethyl methacrylate (2SEM), 2 acrylamido 2 methyl propane sulfonic acid and the like.

In preparation of an anion selective polymer, the polymer is formed by the reaction, for example, of ethylene glycol dimethacrylate (EGDM) with dimethylamino ethyl methacrylate (DMAEM). The resulting polymerizate is then reacted so that the tertiary amine groups are converted to the quaternary ammonium salts to produce an anion selective structure.

In the preparation of a cation selective polymer, the basic polymer is formed, for example, by reacting ethylene glycol dimethacrylate (EGDM) with 2 sulfoethyl methacrylate (2SEM) resulting in a sulfonic acid salt polymerizate where the reactive group consists of $SO_3^-R_2^+$ where R is a univalent cation of H, Na, K, $NH_4$ and the like.

The structures of the present invention may be formed by various methods but it is preferred that a mixture of liquid monomers and activated carbon be polymerized in sheet form between confining glass plates and then posttreated to introduce cation or anion exchange groups as the case may be. Of course the post treatment is not necessary where the monomer employed is already in the exchange group forms as where the monomers themselves contain cation groups such as vinylsulfonic acid, methyl styrene, vinyl phosphoric acid, polychlortrimethylamino ethyl methacrylate and the like. The surface boards are preferable formed on reinforcing or supporting sheet fabrics by placing one or more sheets on a flat bottom casting surface on top of one another. The mixture of activated carbon and the polymerizable monomeric components or partially polymerized components are poured over the support material, covered with a flat top casting surface and then massheated until polymerization is complete. For example the monomer-carbon mixture may be poured into a rectangular tank into which glass plates and a reinforcing web or mat of an inert material such as glass cloth, polypropylene etc. is alternately placed in a stack arrangement and totally covered with the mixture. Thus there is between each pair of smooth glass plates a reinforcing sheet material completely saturated with the carbonmonomeric liquid mix. Thus the parallel glass plates are spaced from each for a distance substantially equal to the thickness of the reinforcing sheet. The tray is then heated and the liquid mixture allowed to polymerize into a solid mass.

The polymer matrix or board which acts as the skeleton for the various functional exchange groups of the novel carbon containing membrane of the present invention are preferable based upon a styrene-divinylbenzene copolymer and may be varied as to their chemical structure over a considerable range as is well known in the art of making membranes. For example the monovinyl aromatic hydrocarbon monomeric component of the board structure can be employed individually or as mixtures and may be styrene (vinyl benzene) or its nuclear and/or alpha substituted derivatives such as ethyl vinyl benzene (ethyl styrene), vinyl toluene (methyl styrene) and its isomers, such as isopropyl styrene, cloromethyl styrenes such as vinyl benzyl chloride, also chlorostyrenes, paramethylstyrene, cyanostyrene, methoxylstyrene, acetyl styrene, dimethylstyrene and the like.

The polyvinyl aromatic monomer which furnishes the cross linking groups to produce an insoluble resin may comprise divinyl benzene (DVB) and substituted derivatives thereof such as the nuclear and/or alpha substituted derivitives such as divinyl toluene, dimethyl divinyl benzene, dimethyl divinyltoluene and the like. Also useful are trivinyl-benzene, trivinylnapthalene, ethyl acrylate, vinyl acetate, etc. The divinyl benzene of commerce usually contains a large fraction of ethyl vinyl benzene (a non cross-linking agent) and also a small amount of nonpolymerizable solvent of diethyl benzene. The highest divinyl benzene content of todays commercial product is about 72% but this is expensive and difficult to obtain, therefore necessitating the use of the more readily available 50-60% DVB. The amount of the cross-linking agent employed may vary within wide limits from 20-80 mole % of the total polymerized monomers in the membrane resin phase with the preferable range being between 25-50 mole %.

The copolymerization of the monomers is accelerated by means of well recognized catalysts such as the azo catalysts (azo-bis-isobutyronitrile being the preferred reagent for this invention). The monomers may also be suitable co-polymerized by the well known art of irradiation whether the source is light or the more effective gamma radiation waves.

Having described the invention in general terms the following examples will illustrate the process of preparing activated carbon containing membranes and the unexpected benefits derived therefrom.

EXAMPLE 1

| 55% | Divinyl benzene (DVB) | 199 ml. | (0.4 mole fraction) |
| --- | --- | --- | --- |
| | Ethylvinyl benzene (EVB) | 159 ml. | (0.3 mole fraction) |
| | Vinyl benzyl chloride (VBC) | 169 ml. | (0.3 mole fraction) |

-continued

| Diethyl benzene (DEB) | 482 ml. |
| --- | --- |
| Azo-bis-isobutyironitrile (AIBN) | 10 gms. |
| Activated bone charcoal | 20% by weight |

The above liquid monomeric mixture is placed into a 3 inches deep polymerization tray having dimensions of 12×10½ inches and alternately sheets of glass plates (9×9 inches) and woven modacrylic cloth is stacked into the mixture (sandwich style) until a total of nine pieces of glass plates alternated with eight pieces of cloth. This tray, with its contents is placed into an explosion proof oven over-night with an initial oven temperature setting of 60° C., rising to 80° C. over the first three hours and then maintaining a polymerization temperature of 80° C., for the balance of a 15 hour period.

At the end of the polymerization period, the solid mass of polymer is released from the tray and after cooling, the glass plates are carefully removed one at a time with concurrent release of the cast polymeric boards which are comprised of bulk polymer encasing the cloth fabric to form a reinforced sheet structure.

The boards are rinsed in methyl alcohol and placed overnight in a solution containing about 25% by volume of trimethylamine in water resulting in the formation of an anion exchange membrane containing quaternary ammonium chloride groups. The membranes are washed in distilled water and measured for resistivities in 0.01 sodium chloride solution at 100 cycles (HZ).

The membranes gave an average resistivity of 15.2 ohm/cm$^2$. Control membranes made exactly as above but without the occluded activated charcoal gave average resistivities of 14.5 ohm/cm$^2$.

EXAMPLE 2

The carbon containing polymerizate residue obtained from the edges of the reaction tray of Example 1 is ground into a loose powder form in a ball mill. A chromatography column having a 28.5 ml. capacity is filled with the ground resin (polymerizate) and a methylene blue solution (one gram per gallon of water) is slowly passed through the activated carbon/resin filled column. The initial effluent from the column is water clear indicating total absorbtion of the blue color by the activated charcoal occluded within the resin. The passage of the solution continues until the break through point, that is the point where the effluent has a shade of blue equivalent to 1% of the original methylene blue solution (i.e. 0.01 gm. of dye per gallon of water).

The same procedure is followed employing 5.7 ml. of pure activated charcoal in the column, which amount is the equivalent of the charcoal contained in the charcoal/resin mixture. Theoretically this quantity of charcoal will absorb 0.48 gms. of methylene blue which is equivalent to 1930 ml. of blue solution employed in the absorbtion test. The results showed 317 ml. of methylene blue solution collected at the break point when using the pure charcoal compared to 204 ml. with the resin/charcoal mixture or 11% activity verses a 6.8% activity respectively. In accordance with the literature bone charcoal when fully activated is about 12% active. The above results definitely prove that the organic monomers and catalyst employed did not totally destroy the activity of the activated charcoal and in fact retained about 62% of the activity of pure bone charcoal.

EXAMPLE 3

The purpose of this example is to determine if the anion exchange membranes of Example 1 containing occluded activated charcoal have less of a tendancy to become decomposed by active hypochlorite when compared to a control sample not containing the carbon. A membrane strip (3"×¾") from each group is placed in a separate container filled with 100 ml. of a 1000 ppm of calcium hypochlorite solution (1 gm./liter). The containers are capped and the membrane samples allowed to stand for four days (room temperature) at which time resistivity measurements (ohm-cm$^2$) are taken in 0.01 N. NaCl at 1000 HZ.

| Membrane | Initial Resistivity | Final Resistivity |
|---|---|---|
| Control | 14.5 | 31.4 |
| 20% Carbon (Bone Charcoal) | 15.2 | 22.8 |

The solution in the container is replaced with 100 ml. of 2000 ppm calcium hypochlorite and allowed to stand for four more days. Resistivity measurement are respectively 460 and 455 ohm-cm$^2$ signifying total decomposition of both membrane samples.

The above results support the conclusion that in a heavily loaded oxidant solution (i.e. 1000 ppm) the carbon loaded membranes retarded its own decomposition by hypochlorite when compared to a control membrane. In actual practice membranes employed in electrodialysis stacks for water desalting are seldom exposed to hypochlorite concentration greater than 5 milligrams per liter per day of operation.

EXAMPLE 4

An ion exchange membrane is prepared by dissolving 10 gms. of polyvinyl chloride into a solution mix of 10 grams of the polyelectrolyte polychlorotrimethylamino ethyl methacrylate crosslinked with one mol % of ethylene glycol dimethacrylate (EGDM) dispersed in a solvent of 100 ml. of cyclohexanone. After heating to form a thick paste the membrane is cast and evaporated from solution on a glass plate. Separately, an activated carbon slurry (1 gram in 10 ml. of cyclohexanone) is coated onto one surface of the dried membrane film and pressed into the surface of the membrane using any convenient flat bed press. The membrane is leached in methyl alcohol to remove the solvent and then equilibrated in water to produce polyelectrolyte membrane containing activated carbon on one major surface. Thermoplastic high molecular weight substances other than polyvinyl chloride could be employed in this example such as polyethylene, acrylonitrile-vinyl chloride copolymer, vinyl chloride-vinylidene chloride copolymer, vinyl chloride-vinyl acetate copolymer and the like.

The embodiments of this invention in which an exclusive property or privilege is claimed are defined as follows:

1. An ion-exchange resin of a synthetic, cross-linked, substantially insoluble polymer, the improvement comprising activated carbon particles contained or imbedded within said ion-exchange polymer.

2. The ion-exchange resin of claim 1 wherein the activated carbon present in said polymer comprises between about 1 to 40% by weight of the polymercarbon mixture.

3. The ion-exchange polymer of claim 2 wherein said activated carbon is bone charcoal having an active surface area of between 300 to 2000 square meters per gram of charcoal.

4. The ion-exchange resin of claim 1 having a structure in a sheet or membrane form and having at least two dimensions in excess of one centimeter.

5. The ion-exchange resin of claim 1 having a substantially spherical bead structure.

6. The ion-exchange resin of claim 1 comprising a polymeric resin of a copolymer of at least one monovinyl aromatic monomer and at least one polyvinyl aromatic cross-linking monomer.

7. The ion-exchange membrane of claim 4 wherein the activated carbon is dispersed substantially throughout the body of the polymer resin.

8. The membrane structure of claim 4 wherein the activated carbon is located substantially only at one or more major surfaces of the membrane.

9. The ion-exchange resin of claim 1 wherein said ion exchange polymer contains a thermoplastic high molecular weight substance selected from the group consisting of polyvinyl chloride, polyethylene, acrylonitrile-vinyl chloride copolymer, vinyl chloride-vinylidene chloride copolymer, vinyl chloride-vinyl acetate copolymer and mixtures thereof.

10. The membrane structure of claim 4 having at least one sheet of a woven or matted reinforcing structure imbedded therein.

11. An electrochemical apparatus comprising chambers adapted to contain liquid defined by ion-permeable membranes and having terminal electrodes for passing a direct current transversely through said chambers and membranes, the improvement wherein at least some of said membranes are comprised of a cross-linked, ion-exchange polymer with said polymer having imbedded therein finely divided particles of activated carbon.

12. The apparatus of claim 11 wherein the activated carbon present in the ion-exchange polymer comprises between about 1 to 40 percent by weight of the polymer-carbon mixture.

* * * * *